(12) United States Patent
Tanaka et al.

(10) Patent No.: US 9,672,846 B1
(45) Date of Patent: Jun. 6, 2017

(54) STO BIAS CONTROL FOR MAMR HEAD RELIABILITY

(71) Applicant: HGST Netherlands B.V., Amsterdam (NL)

(72) Inventors: Hideaki Tanaka, Odawara (JP);
Katsuro Watanabe, Hitachiota (JP);
Shigeru Tadokoro, Odawara (JP);
Wataru Kimura, Fujisawa (JP); Yohji Maruyama, Iruma (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/188,808

(22) Filed: Jun. 21, 2016

(51) Int. Cl.
G11B 5/09 (2006.01)
G11B 5/17 (2006.01)
G11B 5/39 (2006.01)
G11B 5/00 (2006.01)

(52) U.S. Cl.
CPC ............... *G11B 5/09* (2013.01); *G11B 5/17* (2013.01); *G11B 5/3909* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 7,791,829 B2 | 9/2010 | Takeo et al. | |
| 8,570,684 B1 | 10/2013 | Contreras et al. | |
| 8,755,150 B2 | 6/2014 | Chen et al. | |
| 8,917,465 B1 * | 12/2014 | Contreras | G11B 5/455 360/31 |
| 8,995,088 B1 | 3/2015 | Boone et al. | |
| 9,007,723 B1 | 4/2015 | Igarashi et al. | |
| 2004/0070862 A1 * | 4/2004 | Ranmuthu | G11B 5/022 360/68 |
| 2009/0052095 A1 * | 2/2009 | Yamada | G11B 5/02 360/324 |
| 2010/0007992 A1 * | 1/2010 | Yamada | G11B 5/02 360/244 |
| 2010/0214693 A1 * | 8/2010 | Contreras | G11B 5/02 360/125.03 |
| 2011/0300409 A1 * | 12/2011 | Yamada | G01S 19/30 428/815.2 |
| 2013/0083423 A1 * | 4/2013 | Shiroishi | G11B 5/3146 360/75 |
| 2013/0229895 A1 * | 9/2013 | Shiroishi | G11B 5/1278 369/13.14 |

FOREIGN PATENT DOCUMENTS

JP 2012053950 A 3/2012

OTHER PUBLICATIONS

Zhu, J. et al., "Microwave Assisted Magnetic Recording," IEEE Transactions on Magnetics, vol. 44, No. 1, Jan. 2008, 7 pages.

\* cited by examiner

*Primary Examiner* — Peter Vincent Agustin (57) ABSTRACT

The MAMR head comprises a main pole, a spin torque oscillator (STO) positioned over the main pole, and write coils coupled to the main pole. The STO generates a high frequency magnetic field on a magnetic medium. The controller is configured to supply the STO with first bias current at a first bias current level, and further supply the STO with second bias current at a second bias current level. The controller is further configured to time the second bias current to coincide with an electrical current overshoot in the write coils.

16 Claims, 9 Drawing Sheets

STO BIAS CONTROL FOR MAMR HEAD RELIABILITY

BACKGROUND

The present disclosure relates to spin torque oscillators (STO) in magnetic field-assisted recording (MAMR) heads, in which a spin torque oscillator is formed in the write gap, and a high frequency magnetic field is applied to the recording medium in order to reduce the coercive force of the medium, and in this state, apply a recording field to the medium to record data. One challenge with conventional MAMR heads is that electrical current overshoots in the write coils coupled to the main magnetic pole increase the switching field threshold in the magnetic medium, leading to insufficient MAMR assist gain to achieve sufficient recording width and good write-ability. Conventional pulse assist technology in MAMR heads has failed to adequately address the decreased MAMR assist gain associated with the current overshoots in the write coils.

Another challenge with conventional spin torque oscillators is that the small size of the STO is correlated with a bias heating that is significantly high, surpassing 200° C., which may lead to oxidation and performance degradation. While heat sinks and larger STO sizes somewhat mitigate this temperature rise, temperature control is still limited with these approaches, thereby compromising STO performance. Other conventional MAMR heads have addressed this problem with a direct bias current that is constantly applied on the STO during recording. However, this constant application of direct current on the STO leads to significant heat generation, thereby also compromising STO performance.

SUMMARY

To address the above described challenges, a magnetic field-assisted magnetic recording (MAMR) head is provided. The MAMR head comprises a main pole, a spin torque oscillator (STO) positioned over the main pole, and write coils coupled to the main pole. The STO generates a high frequency magnetic field on a magnetic medium. The controller is configured to supply the STO with first bias current at a first bias current level, and further supply the STO with second bias current at a second bias current level. The controller is further configured to time the second bias current to coincide with an electrical current overshoot in the write coils. The second bias current comprises a second bias current ramp-up from the first bias current level to the second bias current level, a second bias current saturation at the second bias current level, and a second bias current ramp-down from the second bias current level to the first bias current level; and the electrical current overshoot comprises an overshoot ramp-up, an overshoot saturation, and an overshoot ramp-down.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

It is to be noted that in drawings of the present application, like reference numerals denote like or corresponding portions. Further, in the drawings of the present application, relations of dimensions, such as lengths, widths and thicknesses, are appropriately changed for the sake of clarification as well as simplification of the drawings, and actual dimensional relations are not shown.

DETAILED DESCRIPTION

Selected embodiments of the present disclosure will now be described with reference to the accompanying drawings. It will be apparent to those skilled in the art from this disclosure that the following description of embodiments of the disclosure is provided for illustration only and not for the purpose of limiting the invention as defined by the appended claims and their equivalents.

Figure 1:
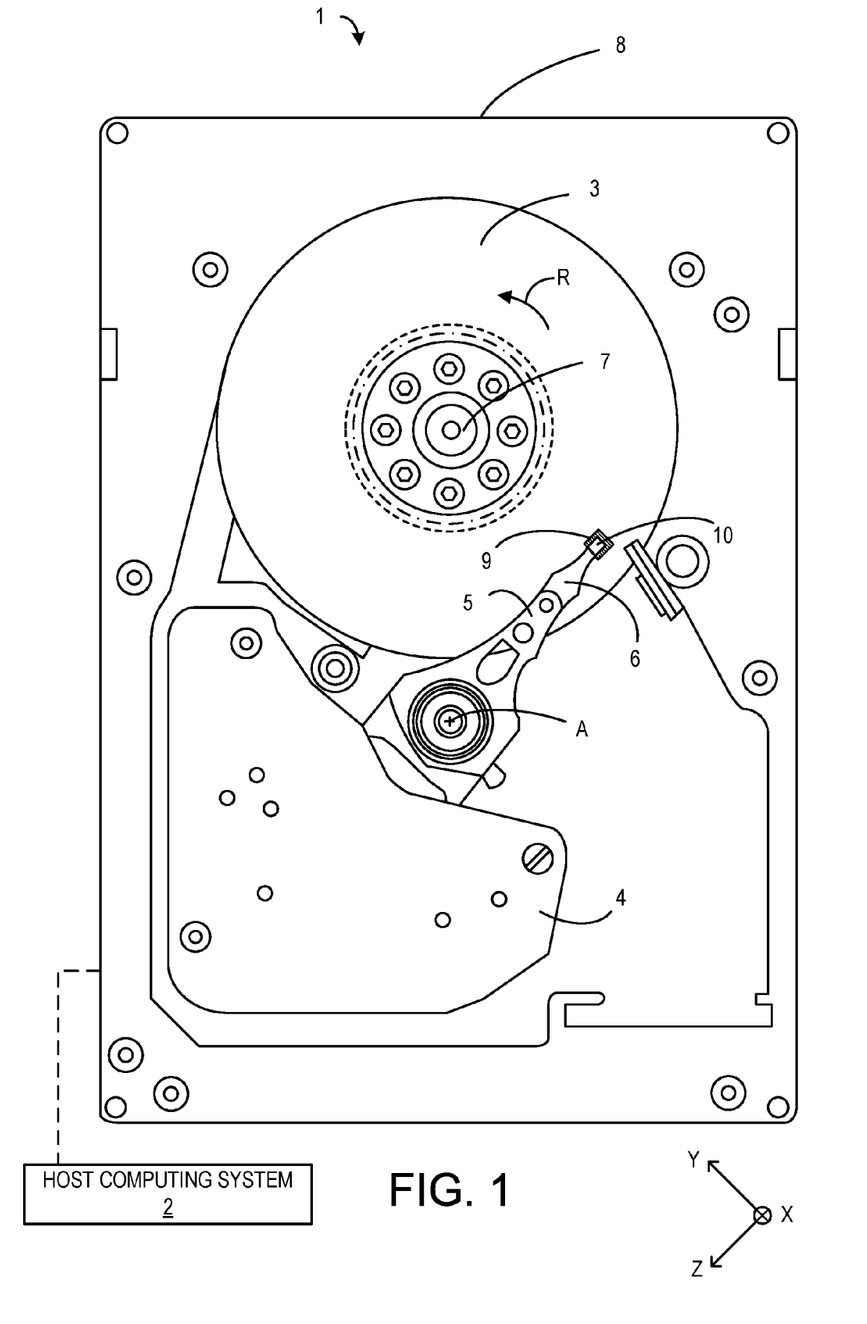
FIG. 1 illustrates an exemplary magnetic recording apparatus according to one disclosed embodiment of the present disclosure.
Figure 2:
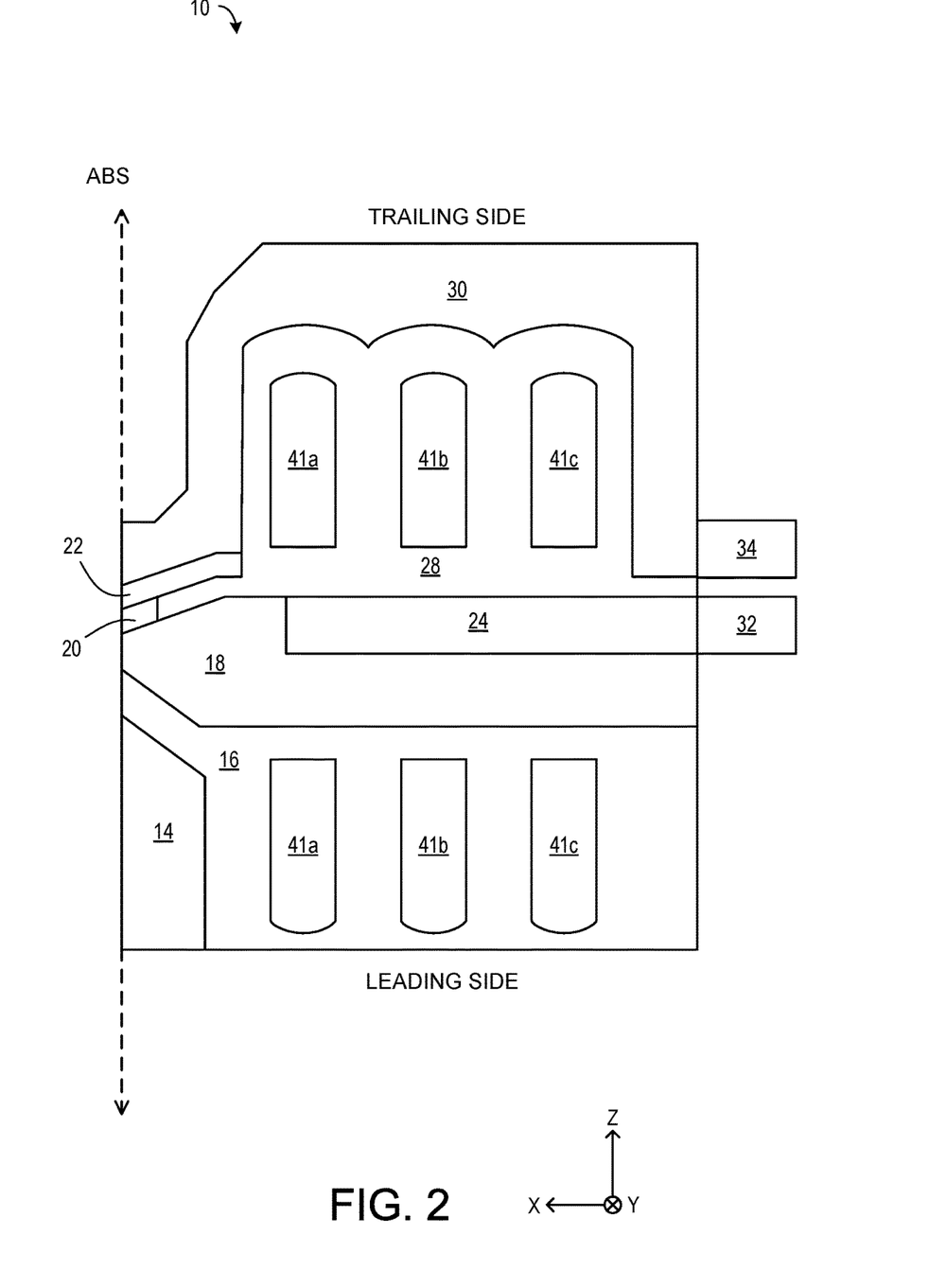
FIG. 2 shows a partial cross-sectional side view through a middle section of a magnetic field-assisted magnetic recording (MAMR) head according to one disclosed embodiment.

The present disclosure is directed to a magnetic field-assisted magnetic recording (MAMR) head with a spin torque oscillator (STO), an embodiment of which is shown beginning in FIG. 2, for a magnetic recording system such as a disk drive as shown in FIG. 1.

Turning initially to FIG. 1, this Figure illustrates a top view of an exemplary hard disk drive (HDD) 1, according to an embodiment of the present disclosure, into which a magnetic field-assisted magnetic recording (MAMR) head 10 of the present disclosure may be incorporated. HDD 1 is a magnetic recording apparatus that is coupled to an associated host computing system 2, and is used to store information used by the computing system 2 during processing. As illustrated, HDD 1 may include one or more perpendicular magnetic recording media 3, actuators 4, actuator arms 5, and suspension arms 6 associated with each of the perpendicular magnetic recording media 3, and a spindle motor 7 affixed in a chassis 8. The perpendicular magnetic recording media 3 may be arranged in a vertical stack, if more than one is provided. Moreover, the one or more perpendicular magnetic recording media 3 may be coupled with the spindle motor 7 for rotation in a rotation direction R.

Perpendicular magnetic recording media 3 may include tracks of data on both the top and bottom surfaces of the disk. A MAMR head mounted on a slider 9 may be positioned on a track. As each disk spins, data may be written on and/or read from the data track via a corresponding recording head and read head. The slider 9 may be coupled to an actuator arm 5 via a suspension arm 6. Actuator arm 5 may be configured to rotate about actuator axis A to place the magnetic head on a particular data track. It is to be understood that the actuator arm 5 alternatively may be configured to move in a manner other than swiveling around actuator axis A.

The suspension arm 6 biases the slider 9 so that the slider 9 bends towards the surface of the perpendicular magnetic recording media 3 when stationary. When the perpendicular magnetic recording media 3 rotates, air is swirled by the rotating disk 3 adjacent to a media facing surface (MFS) of the slider 9, causing the slider 9 to ride on an air bearing a slight distance from the surface of the rotating media 3. For this reason, the MFS is also referred to as an air bearing surface (ABS). When the slider 9 rides on the air bearing, the read and recording heads are employed for reading and writing magnetic transitions corresponding to host data of the host computing system 2. The read and recording heads are connected to signal processing circuitry that operates according to a computer program implemented in a processor or other logic circuitry integrated within or coupled to the HDD 1 to thereby implement the reading and recording functions. In the Figures, the X-direction denotes a flying height direction (henceforth referred to as height direction X) perpendicular to the air-bearing surface (ABS) of the slider, the Y-direction denotes a track-width or cross-track direction, and the Z-direction denotes an along-the-track or down-track direction.

Turning to FIG. 2, a MAMR head 10 is schematically shown according to an embodiment of the present disclosure. FIG. 2 shows a partial cross-sectional side view through a middle section of the MAMR head 10. The STO 20 and the return pole 30 are positioned over the main pole 18, in this order in a stacking direction from a leading side to a trailing side of the MAMR head 10. The STO 20 may be configured as any conventionally known variation, including an AF mode (including both a field generation layer and a spin polarization layer), and an SPL-only mode (including a spin polarization layer with no field generation layer). An insulation layer 28 is positioned on the sides of the STO 20. A trailing shield 22 is positioned on the insulation layer 28 and the STO 20 on a trailing side of the main pole 18, and a leading shield 14 is positioned on a leading side of the STO 20 and main pole 18 on at least the sides of the main pole 18 in a cross-track direction. An insulation layer 16 is positioned between the leading shield 14 and the main pole 18. The main pole 18 is configured to emit a recording magnetic field for affecting a magnetic medium, the main pole 18 serving as a first electrode and having a front portion at an air bearing surface (ABS). The main pole 18 is electrically coupled to the stitched pole 24, positioned on a trailing side of the main pole 18 and recessed away from the ABS in the height direction. The return pole 30 is a magnetic film serving as a second electrode, positioned over a trailing side surface of the main pole 18 and a trailing side surface of the trailing shield 22. The STO 20 that is positioned on the main pole 18 generates a high-frequency magnetic field when supplied with current, and reduces the coercive force of the medium, so that smaller recording fields can be used to record data. The insulation layer 16 is typically a non-magnetic film. The main pole 18 may comprise small grain CoFe or CoFeNi. Although omitted from the Figure for the sake of brevity, it will be appreciated that a substrate layer is formed on a leading side of the leading shield 14 and the insulation layer 16.

Write coils 41a, 41b, and 41c are provided away from the STO 20 in a depth direction, within the insulation layer 16 and the insulation layer 28 so as to encircle the main pole 18 at least on the leading side and trailing side. A return pole 30 is provided on the trailing side of the write coils, and a leading shield 14 is provided on the leading side of the write coils for electromagnetic shielding. Although three write coils 41 are depicted in FIG. 2, it will be appreciated that the quantity of write coils is not particularly limited, and may include any number of write coils 41 that are required to achieve the desired activation of the STO 20. Electrical current flows through the STO 20 via the stitched pole 24, main pole 18, trailing shield 22, and the return pole 30; as a result, the write coils 41 induce a gap magnetic field that excites the main pole 18 and permeates the STO 20, activating the STO 20 so as to generate a high frequency magnetic field.

Further, the STO 20 is electrically coupled between the first STO electrode 32 and second STO electrode 34, which may comprise non-magnetic material. The first STO electrode 32 is electrically coupled to the stitched pole 24, which in turn is electrically coupled to the main pole 18, while the second STO electrode 34 is electrically coupled to the return pole 30. Viewed from a perspective facing the MAMR head 10 in a cross-track direction, the STO electrodes 32, 34 are configured in parallel to each other perpendicularly to the ABS in the immediate vicinity of the main pole 18 and return pole 30. It will be appreciated that the schematic depiction of the MAMR head 10 in FIG. 2 is a rough, non-proportional depiction that illustrates the coupling relationships between the various layers and components in the MAMR head 10, and the lengths of the first and second STO electrodes may extend beyond the perspective view of this Figure in the height direction X.

Figure 3:
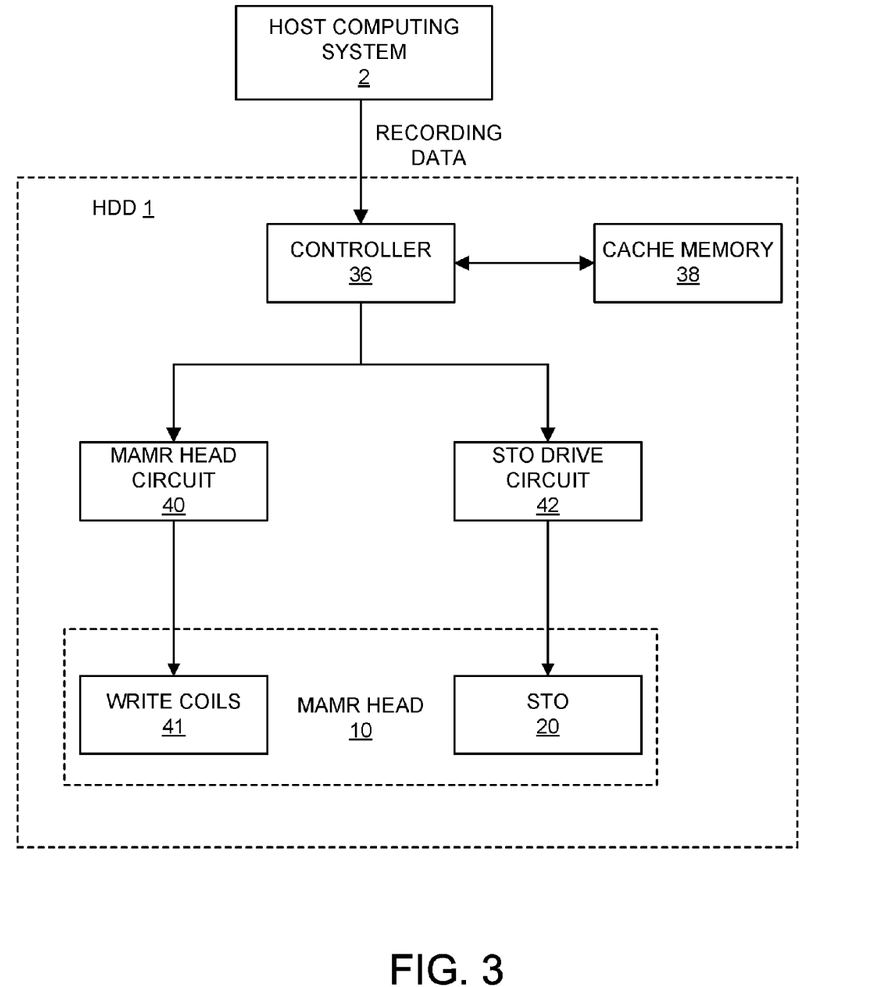
FIG. 3 shows a block diagram illustrating an exemplary magnetic recording apparatus according to one disclosed embodiment.

Referring to FIG. 3, a block diagram of the HDD 1 of the present disclosure is illustrated. It will be appreciated that a controller 36 is operatively coupled to the write coils 41 via the MAMR head circuit 40 and the STO 20 via the STO drive circuit 42. The controller 36 typically is a processor configured to execute software instructions stored in an associated non-volatile memory using portions of volatile, random access memory to achieve the functions described herein, but may alternatively be a dedicated logic circuit, such as an ASIC, FPGA, etc. The MAMR head circuit 40 and STO drive circuit 42 each contain a preamplifier that enables control of the electrical current supplying write coils 41 and the STO 20, respectively. The host computing system 2 transmits recording data to the controller 36, which stores the recording data in volatile memory within the controller 36. Based on control information stored in a cache memory 38, which may comprise non-volatile memory, the controller converts recording data into recording pattern signals that are sent to the MAMR head circuit 40 and the STO drive circuit 42. The MAMR head circuit 40 supplies the write coils 41 with recording current that is synchronized with the recording pattern signals. This excites the main pole 18 that is coupled to the write coils 41, generating a recording magnetic field that is synchronized with the recording pattern signals. The recording magnetic field is subsequently applied to the perpendicular magnetic recording media 3. The STO drive circuit 42 is configured to supply electrical current, which is synchronized with the recording pattern signals, to the STO 20. In response, the spin of the electrons passing through the spin polarization layer of the STO 20 are polarized, so that the polarized stream of electrons exerts a spin torque to the oscillation layer of the STO 20, thereby magnetizing the oscillation layer. Subsequently, the STO 20 generates a high frequency magnetic field through ferromagnetic resonance of the magnetized oscillation layer, applying the high-frequency magnetic field to the perpendicular magnetic recording media 3, in order to reduce the coercive force of the medium and thereby reduce the switching field threshold, below which the magnetization of the medium will not reverse within the reversing field duration. Alternatively, it will be appreciated that the controller 36 may instead be configured to divide electrical current that is supplied to the MAMR head into two currents that are synchronized and sent to the STO 20 and the write coils 41, thereby dispensing with separate circuits supplying separate electrical currents.

Figure 4:
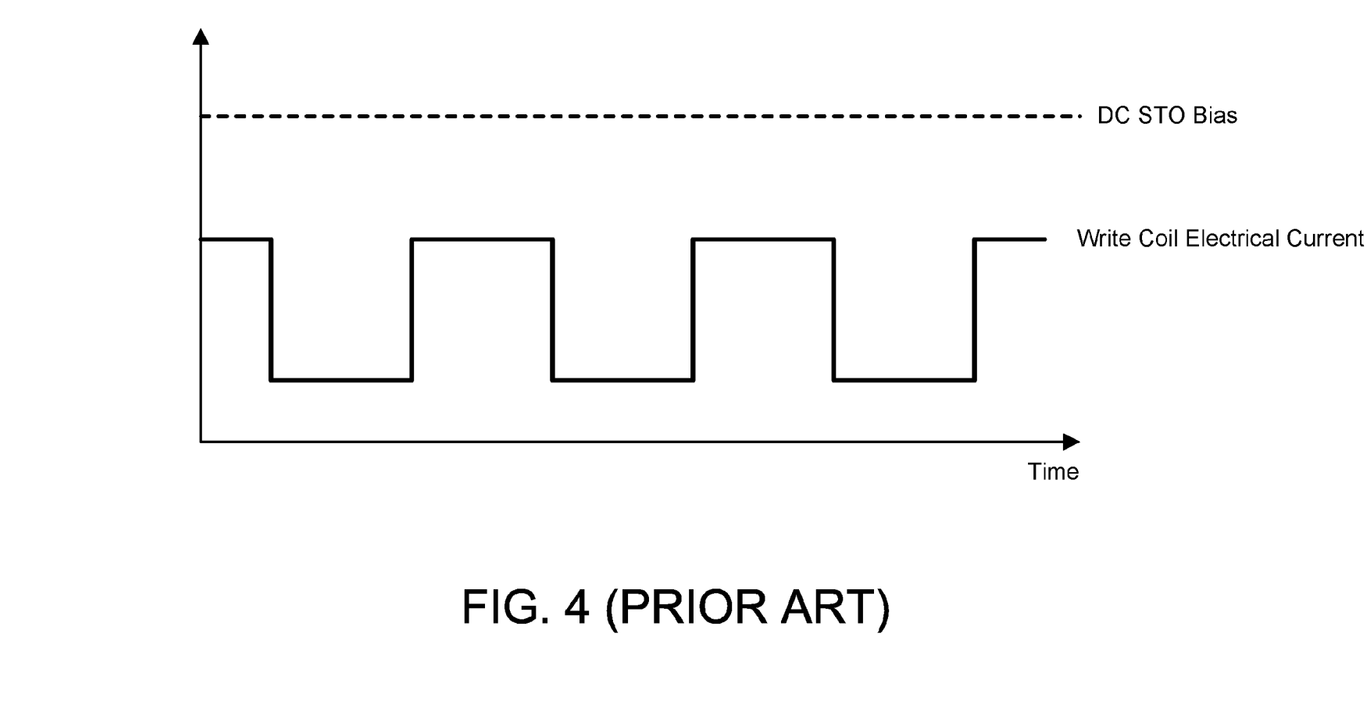
FIG. 4 shows a plot illustrating a conventional DC STO bias mode, showing the relationship between the electrical waveform of a current supplied to conventional write coils and the electrical waveform of a current supplied to the conventional STO in the conventional MAMR head.

In the conventional art, the STO drive circuit 42 may supply electrical current to the STO 20 in one of two ways: the DC STO bias mode and the pulse assist mode. Turning to FIG. 4, a basic plot illustrates the DC STO bias mode, showing the relationship of the waveform of the electrical current supplied to the conventional write coils coupled to the conventional main pole and the waveform of the direct current supplied to the conventional STO in the conventional MAMR head. It is noted that the STO drive circuit 42 supplies a direct current (DC STO bias) that is constant regardless of the change in the write current that is supplied to the conventional write coils. Subsequent inventors have sought to improve upon the efficiency of the DC STO bias mode by reducing the amount of electrical current that is supplied to the STO 20 without compromising its performance. One such improvement is known as the pulse assist mode, which is described below.

Figure 5:
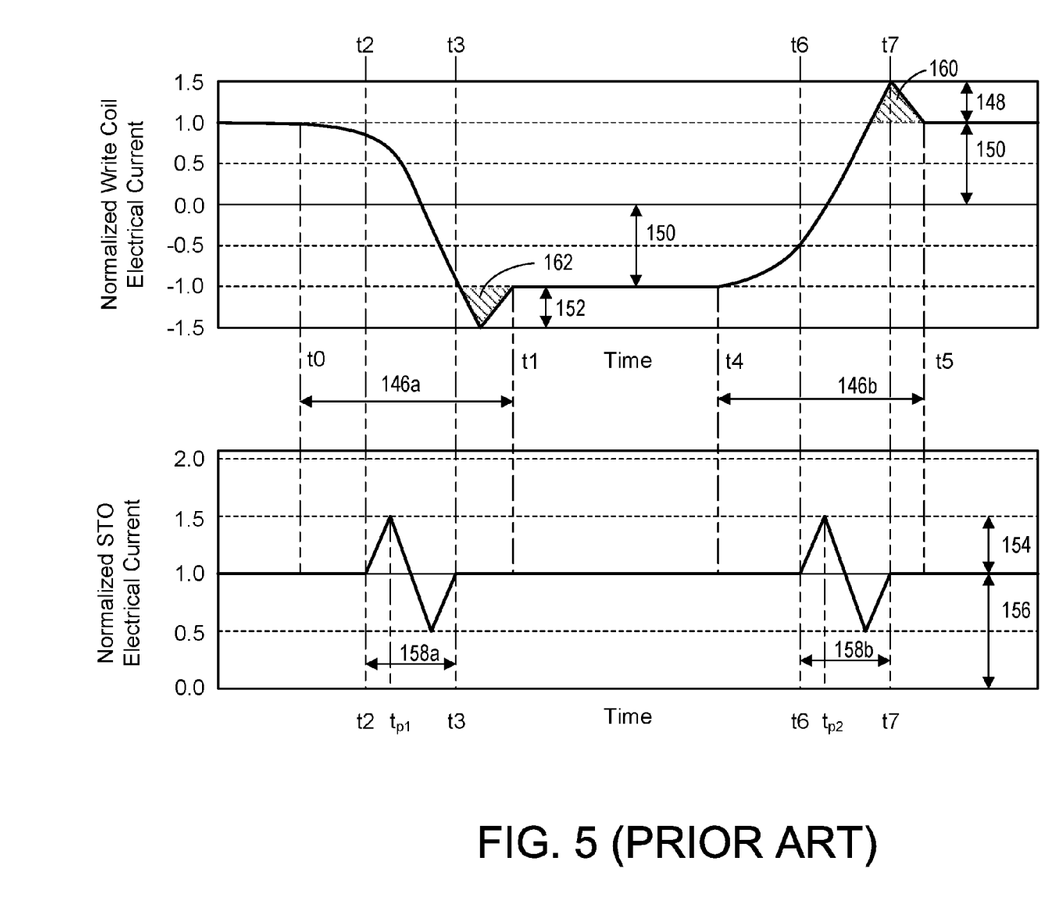
FIG. 5 shows a plot illustrating a conventional pulse assist mode, showing the relationship between the electrical waveform of a current supplied to conventional write coils and the electrical waveform of a current supplied to the conventional STO in the conventional MAMR head.

Referring to FIG. 5, a plot illustrates the pulse assist mode, showing the relationship of the waveform of the electrical current supplied to the conventional write coils coupled to the conventional main pole and the waveform of the electrical current supplied to the conventional STO in the conventional MAMR head, as generally described in Japanese Published Application No. 2012053950. The top graph shows the electrical waveform of the current supplied to the write coils of the MAMR head, while the bottom graph shows the electrical waveform of the current supplied to the STO, and both graphs are superimposed over the same horizontal time axis. The vertical axes represent electrical current supplied to write coils of the MAMR head and the STO, respectively, in normalized units. As shown in the top graph, between the start of magnetic reversal $t_0$ and the end of magnetic reversal $t_1$ during the first magnetic reversal period 146a, the coercive force of the magnetic medium under the main pole drops to the point where the polarity of the magnetic medium reverses, and then increases in the negative direction. There is a negative electrical current overshoot 162 at a negative overshoot amplitude 152 as the electrical current over-shoots the MAMR head current amplitude 150 in the negative direction, before the MAMR head current amplitude stabilizes at −1.0. As shown in the bottom graph, a first STO bias current is constantly applied to maintain the STO current oscillation 156 at 1.0 for time periods outside of the pulse electric intervals 158a, 158b. During the first magnetic reversal period 146a, a positive pulse current and negative pulse current are applied to the STO to increase and decrease the oscillation amplitude during the first pulse electric interval 158a, which begins at time $t_2$ and ends at time $t_3$. This results in a high frequency magnetic field being applied to the recording medium to further reduce the switching field threshold, thereby preventing a reduction in the recording width. The STO pulse oscillation amplitude 154 during the first pulse electric interval 158a is the difference between the first current and the pulse current that is applied during the first pulse electric interval 158a. The peak timing $t_{p1}$ of the STO oscillation electrical current is roughly timed to coincide with the moment when the coercive force of the main pole is roughly zero. The first pulse electric interval 158a is configured to be shorter than the first magnetic reversal period 146a.

Likewise, between the start of magnetic reversal $t_4$ and the end of magnetic reversal $t_5$ during the second magnetic reversal period 146b, the coercive force of the magnetic medium under the main pole increases to the point where the polarity of the magnetic medium reverses, and then increases in the positive direction. There is an electrical current overshoot 160 at overshoot amplitude 148 as the electrical current overshoots the MAMR head current amplitude 150, before the MAMR head current amplitude stabilizes at 1.0. During the second magnetic reversal period 146b, a positive pulse current and negative pulse current are applied to the STO to increase and decrease the oscillation amplitude during the second pulse electric interval 158b, which begins at time t6 and ends at time t7. This results in a high frequency magnetic field being applied to the recording medium to further reduce the switching field threshold, thereby preventing a reduction in the recording width. The peak timing $t_{p2}$ of the STO oscillation electrical current is roughly timed to coincide with the moment when the coercive force of the main pole is roughly zero. The second pulse electric interval 158b is configured to be shorter than the second magnetic reversal period 146b.

However, this conventional MAMR head fails to maintain pulse current to the STO when positive current overshoots 160 (current overshoots in the positive direction) and negative current overshoots 162 (current overshoots in the negative direction) occur in the MAMR head. In other words, the timing and length of the first pulse electric interval 158a are insufficient to reduce the switching field threshold when the negative current overshoot 162 occurs. Likewise, the timing and length of the second pulse electric interval 158b are insufficient to reduce the switching field threshold when the current overshoot 160 occurs. Consequently, conventional MAMR heads do not enable sufficient MAMR assist gain to sufficiently prevent a reduction in the recording width. Moreover, this conventional MAMR head requires significant electrical power to constantly supply the STO with first bias current to maintain the STO electrical current oscillation at 1.0 for time periods outside of the pulse electric intervals 158a, 158b. This leads to significant heat generation that also compromises STO performance.

Figure 6:
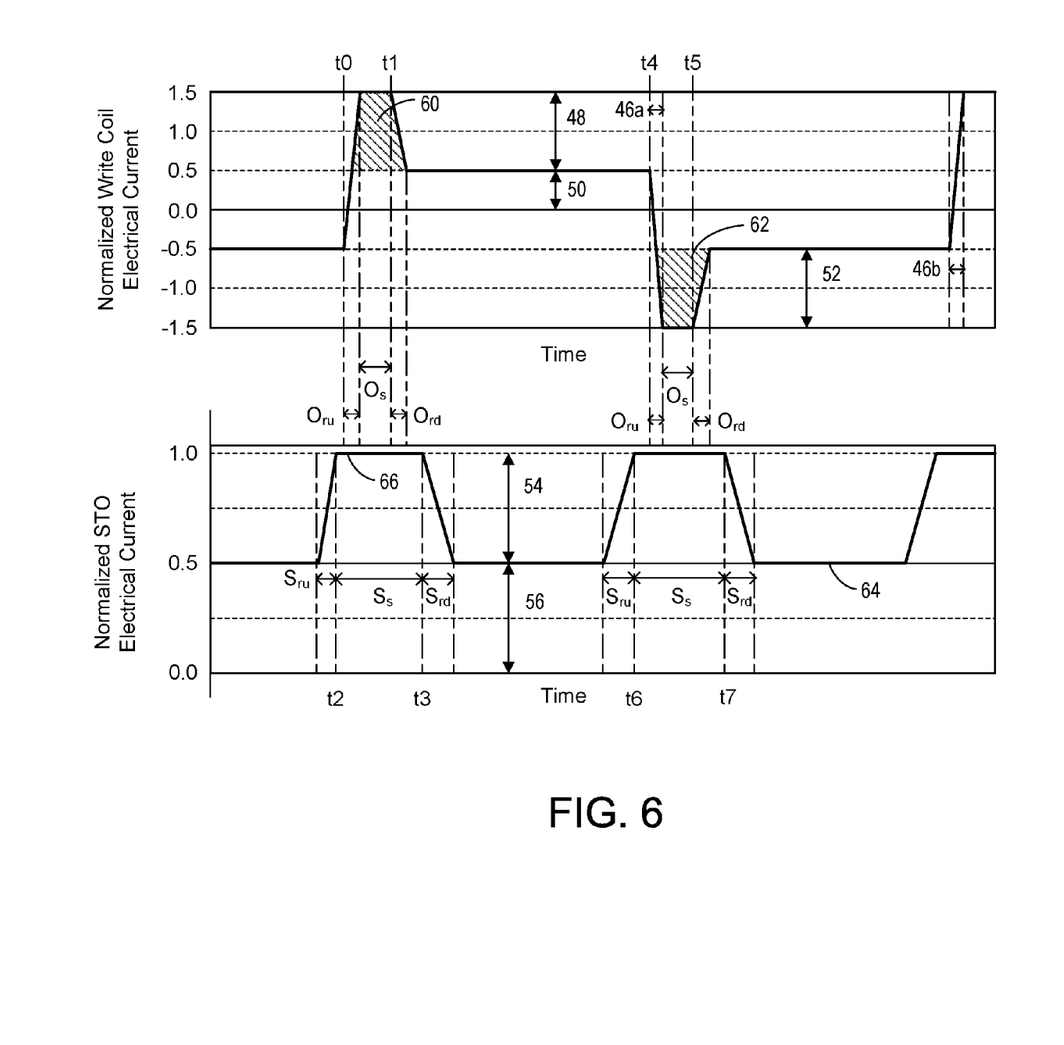
FIG. 6 shows a plot illustrating the relationship between the electrical waveform of a current supplied to write coils and the electrical waveform of a current supplied to the STO in the MAMR head according to the first embodiment of the present disclosure.

Referring to FIG. 6, a plot showing the relationship of the electrical waveform of the current supplied to the write coils and the electrical waveform of the current supplied to the STO in the MAMR head of a first embodiment during continuous writing is illustrated. Both plots are superimposed over the same horizontal time axis. The vertical axes represent electrical current supplied to write coils of the MAMR head and the STO, respectively, in normalized units. In view of the above described problems, where the pulse electric intervals are insufficient to enable sufficient MAMR assist gain and significant electrical power is required for the STO, a controller is provided, in which the controller is configured to supply the STO with a first bias current at a first bias current level 64 to achieve a STO current oscillation amplitude 56 at 0.5. The controller is configured to further supply the STO with a second bias current at a second bias current level 66 to achieve a STO pulse oscillation amplitude 54 of 0.5, and time the second bias current to coincide with a positive electrical current overshoot 60 in the write coils 41. The second bias current may be more than 1.4 and less than 3 times the magnitude of the first bias current. The second bias current comprises a second bias current ramp-up (indicated by double-headed arrow $S_{ru}$), a second bias current saturation (indicated by double-headed arrow $S_s$), and a second bias current ramp-down (indicated by double-headed arrow $S_{rd}$). The positive electrical current overshoot 60, having an overshoot amplitude 48 and over-shooting the MAMR head current amplitude 50, comprises an overshoot ramp-up (indicated by double-headed arrow $O_{ru}$, typically lasting less than 100 ps), an overshoot saturation (indicated by double-headed arrow $O_s$, typically lasting ~300 ps), and overshoot ramp-down (indicated by double-headed arrow $O_{rd}$). For the positive electrical current overshoot 60, the controller is configured to start $t_2$ the second bias current saturation before the start $t_0$ of overshoot ramp-up $O_{ru}$, and end $t_3$ the second bias current saturation after the start $t_1$ of the overshoot ramp-down $O_{rd}$.

Likewise, the negative electrical current overshoot 62, having a negative overshoot amplitude 52 and over-shooting the MAMR head current amplitude 50 in the negative direction, comprises an overshoot ramp-up (indicated by double-headed arrow $O_{ru}$), an overshoot saturation (indicated by double-headed arrow $O_s$), and overshoot ramp-down (indicated by double-headed arrow $O_{rd}$). For the negative electrical current overshoot 62, the controller is configured to start $t_6$ the second bias current saturation before the start $t_4$ of overshoot ramp-up $O_{ru}$, and end $t_7$ the second bias current saturation after the start $t_5$ of the overshoot ramp-down $O_{rd}$. The duration of each cycle of the second bias current (between $t_2$ and $t_6$ or between $t_3$ and $t_7$) may be on the order of several hundred picoseconds, or typically ~1000 ps.

It will be noted that, in the first embodiment, the second bias current saturation coincides with the positive overshoot 60 and negative overshoot 62 as well as the first magnetic reversal period 46a, when the coercive force of the magnetic medium under the main pole drops to the point where the polarity of the magnetic medium reverses, and then increases in the negative direction, and the second magnetic reversal period 46b, when the coercive force of the magnetic medium increases to the point where the polarity of the magnetic medium reverses, and then increases in the positive direction. Accordingly, the magnetic recording apparatus can sufficiently reduce the switching field threshold when current overshoots occur, and thereby enable sufficient MAMR assist gain to sufficiently prevent a reduction in the recording width while achieving significant savings in electrical power supplied to the STO to avoid excessive heat generation in the STO.

Figure 7A:
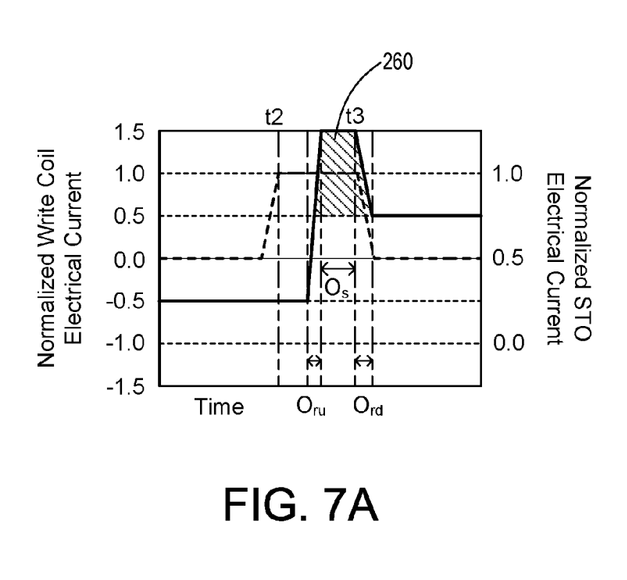
FIGS. 7A-B show plots illustrating the relationship between the electrical waveform of a current supplied to write coils and the electrical waveform of a current supplied to the STO in the MAMR head according to the second embodiment of the present disclosure.
Figure 7B:
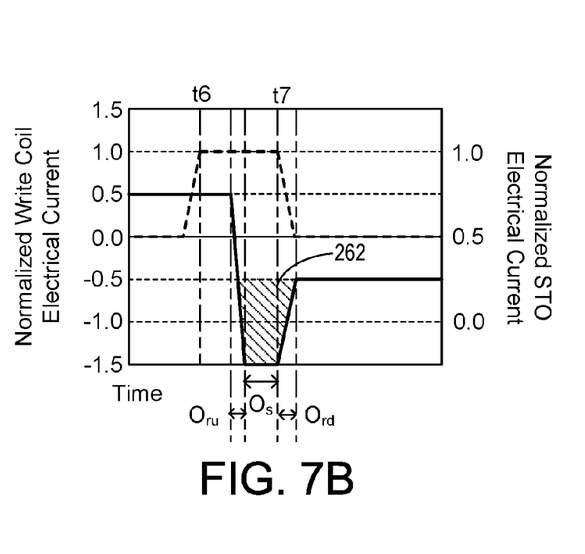

Turning to FIG. 7A-B, plots showing the relationship of the electrical waveform of the current supplied to the write coils and the electrical waveform of the current supplied to the STO in the MAMR head of a second embodiment during continuous writing are illustrated. FIG. 7A shows the electrical waveform of the current supplied during a positive overshoot 260 in the write coils, while FIG. 7B shows the electrical waveform of the current supplied during a negative overshoot 262 in the write coils. Since the electrical waveforms of the second embodiment are generally similar to those of the first embodiment with the exception of the timing of the second bias current saturation, the detailed description thereof is abbreviated here for the sake of brevity. It is to be noted that like parts are designated by like reference numerals throughout the detailed description and the accompanying drawings. For the positive electrical current overshoot 260, the controller is configured to start $t_2$ the second bias current saturation before the start of overshoot ramp-up $O_{ru}$, and end $t_3$ the second bias current saturation at the start of the overshoot ramp-down $O_{rd}$. For the negative electrical current overshoot 262, the controller is configured to start $t_6$ the second bias current saturation before the start of overshoot ramp-up $O_{ru}$, and end $t_7$ the second bias current saturation at the start of the overshoot ramp-down $O_{rd}$. In accordance with the second embodiment, the duration of the second bias current saturation can be shortened to save electrical power, while still sufficiently reducing the switching field threshold during the current overshoots in the write coils.

Figure 8A:
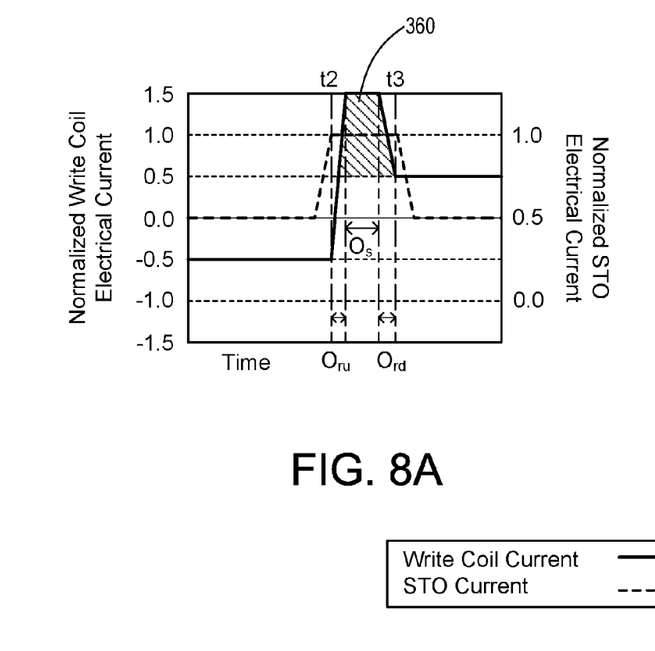
FIGS. 8A-B show plots illustrating the relationship between the electrical waveform of a current supplied to write coils and the electrical waveform of a current supplied to the STO in the MAMR head according to the third embodiment of the present disclosure.
Figure 8B:
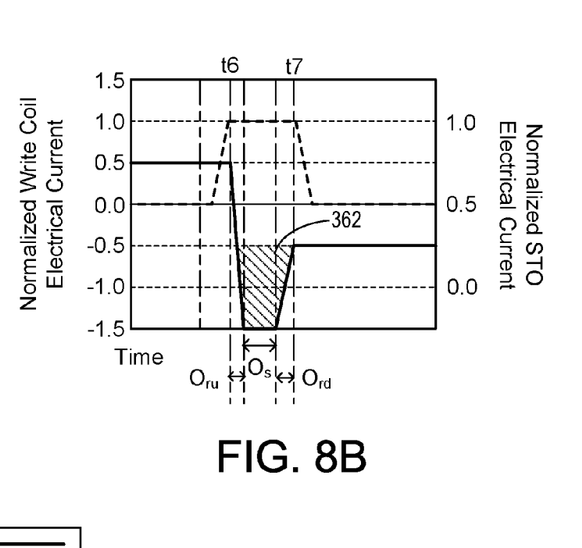

Turning to FIG. 8A-B, plots showing the relationship of the electrical waveform of the current supplied to the write coils and the electrical waveform of the current supplied to the STO in the MAMR head of a third embodiment during continuous writing are illustrated. FIG. 8A shows the electrical waveform of the current supplied during a positive overshoot 360 in the write coils, while FIG. 8B shows the electrical waveform of the current supplied during a negative overshoot 362 in the write coils. Since the electrical waveforms of the third embodiment are generally similar to those of the first embodiment with the exception of the timing of the second bias current saturation, the detailed description thereof is abbreviated here for the sake of brevity. It is to be noted that like parts are designated by like reference numerals throughout the detailed description and the accompanying drawings. For the positive electrical current overshoot 360, the controller is configured to start $t_2$ the second bias current saturation at the start of overshoot ramp-up $O_{ru}$, and end $t_3$ the second bias current saturation after the start of the overshoot ramp-down $O_{rd}$. For the negative electrical current overshoot 362, the controller is configured to start $t_6$ the second bias current saturation at the start of overshoot ramp-up $O_{ru}$, and end $t_7$ the second bias current saturation after the start of the overshoot ramp-down $O_{rd}$. In accordance with the third embodiment, the duration of the second bias current saturation can be shortened to save electrical power, while still sufficiently reducing the switching field threshold during the current overshoots in the write coils.

Figure 9A:
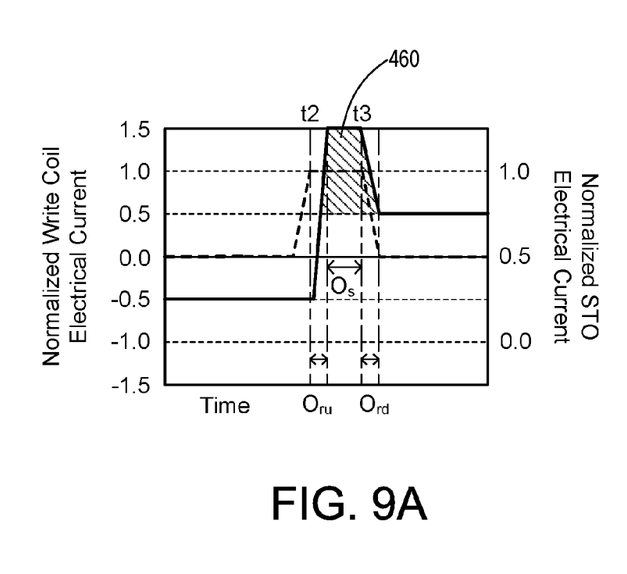
FIGS. 9A-B show plots illustrating the relationship between the electrical waveform of a current supplied to write coils and the electrical waveform of a current supplied to the STO in the MAMR head according to the fourth embodiment of the present disclosure.
Figure 9B:
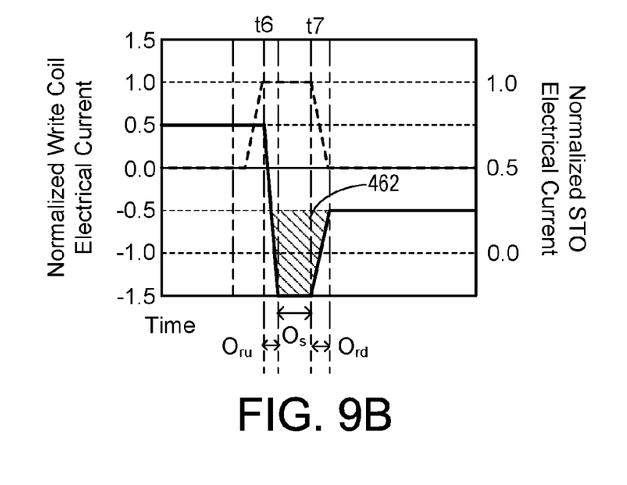

Turning to FIG. 9A-B, plots showing the relationship of the electrical waveform of the current supplied to the write coils and the electrical waveform of the current supplied to the STO in the MAMR head of a fourth embodiment during continuous writing are illustrated. FIG. 9A shows the electrical waveform of the current supplied during a positive overshoot 460 in the write coils, while FIG. 9B shows the electrical waveform of the current supplied during a negative overshoot 462 in the write coils. Since the electrical waveforms of the fourth embodiment are generally similar to those of the first embodiment with the exception of the timing of the second bias current saturation, the detailed description thereof is abbreviated here for the sake of brevity. It is to be noted that like parts are designated by like reference numerals throughout the detailed description and the accompanying drawings. For the positive electrical current overshoot 460, the controller is configured to start $t_2$ the second bias current saturation at the start of overshoot ramp-up $O_{ru}$, and end $t_3$ the second bias current saturation at the start of the overshoot ramp-down $O_{rd}$. For the negative electrical current overshoot 462, the controller is configured to start $t_6$ the second bias current saturation at the start of overshoot ramp-up $O^{ru}$, and end $t_7$ the second bias current saturation at the start of the overshoot ramp-down $O_{rd}$. In accordance with the fourth embodiment, the duration of the second bias current saturation can be further shortened to save electrical power, while still sufficiently reducing the switching field threshold during the current overshoots in the write coils.

According to the present disclosure as described above, embodiments of a magnetic recording apparatus are provided to sufficiently reduce the switching field threshold in the recording medium when current overshoots occur in the write coils, and thereby enable sufficient MAMR assist gain to sufficiently prevent a reduction in the recording width while achieving significant savings in electrical power supplied to the STO to avoid excessive heat generation in the STO. Embodiments are disclosed with varying timings of the second bias current saturation to achieve savings in electrical power supplied to the STO while still achieving the potential advantages described above. As a result, writeability of the MAMR head is significantly increased for the magnetic recording apparatus.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A magnetic recording apparatus comprising:
   a magnetic field-assisted magnetic recording (MAMR) head comprising a main pole, a spin torque oscillator (STO) positioned over the main pole, and write coils coupled to the main pole, and
   a controller operatively coupled to the MAMR head; wherein
   the STO is configured to generate a high frequency magnetic field on a magnetic medium,
   the controller is configured to supply the STO with first bias current at a first bias current level,
   the controller is configured to further supply the STO with second bias current at a second bias current level, and
   the controller is configured to time the second bias current to coincide with an electrical current overshoot in the write coils, wherein
   the second bias current comprises a second bias current ramp-up from the first bias current level to the second bias current level, a second bias current saturation at the second bias current level, and a second bias current ramp-down from the second bias current level to the first bias current level, and
   the electrical current overshoot comprises an overshoot ramp-up, an overshoot saturation, and an overshoot ramp-down.

2. The magnetic recording apparatus of claim 1, wherein the second bias current is more than 1.4 and less than 3 times the magnitude of the first bias current.

3. The magnetic recording apparatus of claim 1, wherein the controller is further configured to start the second bias current saturation before start of overshoot ramp-up.

4. The magnetic recording apparatus of claim 3, wherein the controller is further configured to end the second bias current saturation at start of overshoot ramp-down.

5. The magnetic recording apparatus of claim 3, wherein the controller is further configured to end the second bias current saturation after start of overshoot ramp-down.

6. The magnetic recording apparatus of claim 1, wherein the controller is further configured to start the second bias current saturation at start of overshoot ramp-up.

7. The magnetic recording apparatus of claim 6, wherein the controller is further configured to end the second bias current saturation at start of overshoot ramp-down.

8. The magnetic recording apparatus of claim 6, wherein the controller is further configured to end the second bias current saturation after start of overshoot ramp-down.

9. The magnetic recording apparatus of claim 1, wherein the controller is further configured to time the second bias current to coincide with a negative electrical current overshoot in the main pole, and
   the negative electrical current overshoot comprises an overshoot ramp-up, an overshoot saturation, and an overshoot ramp-down.

10. The magnetic recording apparatus of claim 9, wherein the second bias current is more than 1.4 and less than 3 times the magnitude of the first bias current.

11. The magnetic recording apparatus of claim 9, wherein the controller is further configured to start the second bias current saturation before start of overshoot ramp-up.

12. The magnetic recording apparatus of claim 11, wherein the controller is further configured to end the second bias current saturation at start of overshoot ramp-down.

13. The magnetic recording apparatus of claim 11, wherein the controller is further configured to end the second bias current saturation after start of overshoot ramp-down.

14. The magnetic recording apparatus of claim 1, wherein the controller is further configured to start the second bias current saturation at start of overshoot ramp-up.

15. The magnetic recording apparatus of claim 14, wherein the controller is further configured to end the second bias current saturation at start of overshoot ramp-down.

16. The magnetic recording apparatus of claim 14, wherein the controller is further configured to end the second bias current saturation after start of overshoot ramp-down.

* * * * *